(12) United States Patent
Krakus

(10) Patent No.: US 11,178,802 B2
(45) Date of Patent: Nov. 23, 2021

(54) GARDENING TOOL

(71) Applicant: Stanislaw Krakus, St-Bruno-de-Montarville (CA)

(72) Inventor: Stanislaw Krakus, St-Bruno-de-Montarville (CA)

( * ) Notice: Subject to any disclaimer, the term of this patent is extended or adjusted under 35 U.S.C. 154(b) by 0 days.

(21) Appl. No.: 17/171,526

(22) Filed: Feb. 9, 2021

(65) Prior Publication Data

US 2021/0251124 A1 Aug. 19, 2021

(30) Foreign Application Priority Data

Feb. 18, 2020 (CA) ...................................... 3072792
Dec. 17, 2020 (CA) ...................................... 3102842

(51) Int. Cl.
*A01B 1/10* (2006.01)
*A01B 1/20* (2006.01)
*A01B 1/22* (2006.01)

(52) U.S. Cl.
CPC .................. *A01B 1/10* (2013.01); *A01B 1/20* (2013.01); *A01B 1/225* (2013.01)

(58) Field of Classification Search
CPC .... A01B 1/06; A01B 1/10; A01B 1/20; A01B 1/225
USPC ......... 172/372, 373, 374; 56/400.04, 400.05, 56/400.06
See application file for complete search history.

(56) References Cited

U.S. PATENT DOCUMENTS

| | | | | |
|---|---|---|---|---|
| 132,520 | A * | 10/1872 | Buttles | A01B 1/20 172/374 |
| 240,767 | A * | 4/1881 | Roach | A01B 1/222 172/373 |
| 614,356 | A * | 11/1898 | Watson | A01B 1/222 172/373 |
| 806,707 | A * | 12/1905 | Pellegrin et al. | A01B 1/06 172/358 |
| 886,203 | A * | 4/1908 | Grasshaw | A01B 1/222 172/373 |
| 1,309,228 | A * | 7/1919 | Tellin | A01B 1/222 172/373 |
| 1,339,222 | A * | 5/1920 | Randall | A01B 1/222 172/373 |
| 1,414,087 | A | 4/1922 | Kenny | |

(Continued)

FOREIGN PATENT DOCUMENTS

| | | |
|---|---|---|
| CH | 124284 | 1/1928 |
| JP | 3200133 | 10/2015 |

*Primary Examiner* — Gary S Hartmann
(74) *Attorney, Agent, or Firm* — Benoit & Cote Inc.; C. Marc Benoit

(57) ABSTRACT

A gardening tool adapted to being attached to a rake, the rake having an elongated handle and teeth. The gardening tool comprises a blade, an attachment system, a prong attachment and a prong. The blade has a perimeter defined by a first and a second lateral edges as well as a first and a second transversal edges. The attachment system, which attaches the blade to the rake, is operative to secure the blade against the teeth of the rake. The prong attachment is located on the blade proximate to the first lateral edge. The prong, being pivotally attached to the blade through the prong attachment, may selectively adopt one of the following positions: a) extending primarily beyond the first transversal edge; b) extending primarily beyond the first lateral side; and c) being stored primarily within the perimeter.

20 Claims, 6 Drawing Sheets

(56) References Cited

U.S. PATENT DOCUMENTS

| | | | | |
|---|---|---|---|---|
| 2,061,542 A | * | 11/1936 | Appenzeller | A01B 1/222 |
| | | | | 172/373 |
| 2,712,782 A | * | 7/1955 | Blankenship | A01B 1/20 |
| | | | | 172/374 |
| 3,232,351 A | * | 2/1966 | Wilson | A01G 3/06 |
| | | | | 172/18 |
| 9,295,187 B2 | * | 3/2016 | Wroolie | A01B 1/22 |

* cited by examiner

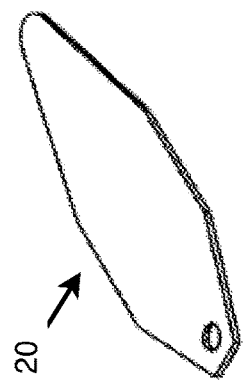
Fig. 5A
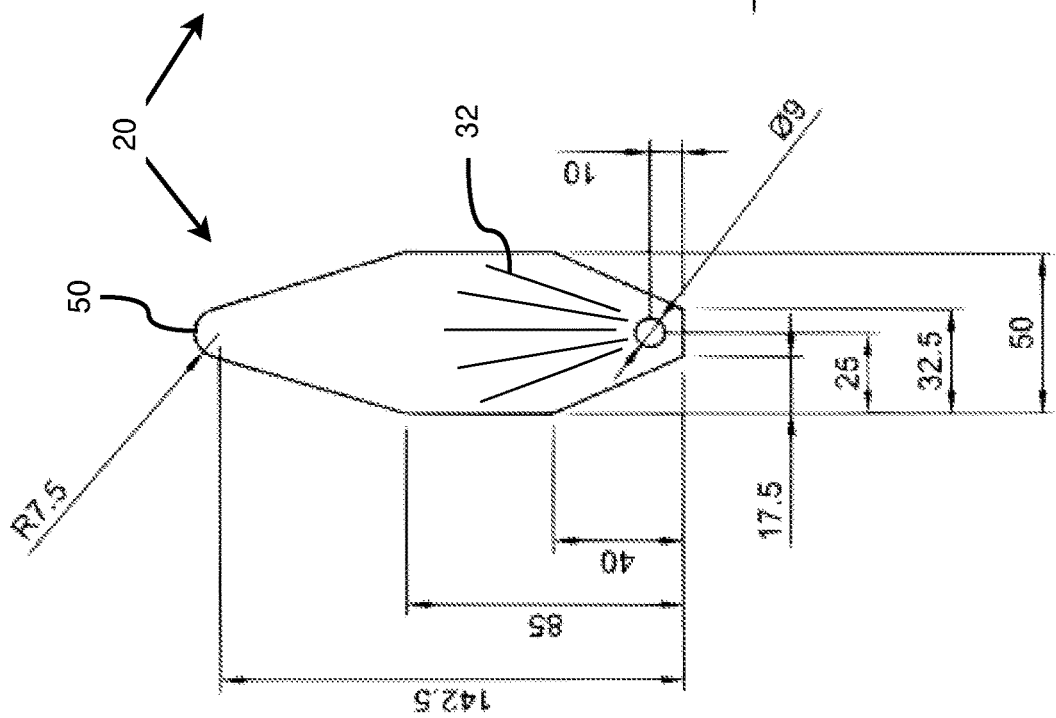
Fig. 5B
Fig. 5C

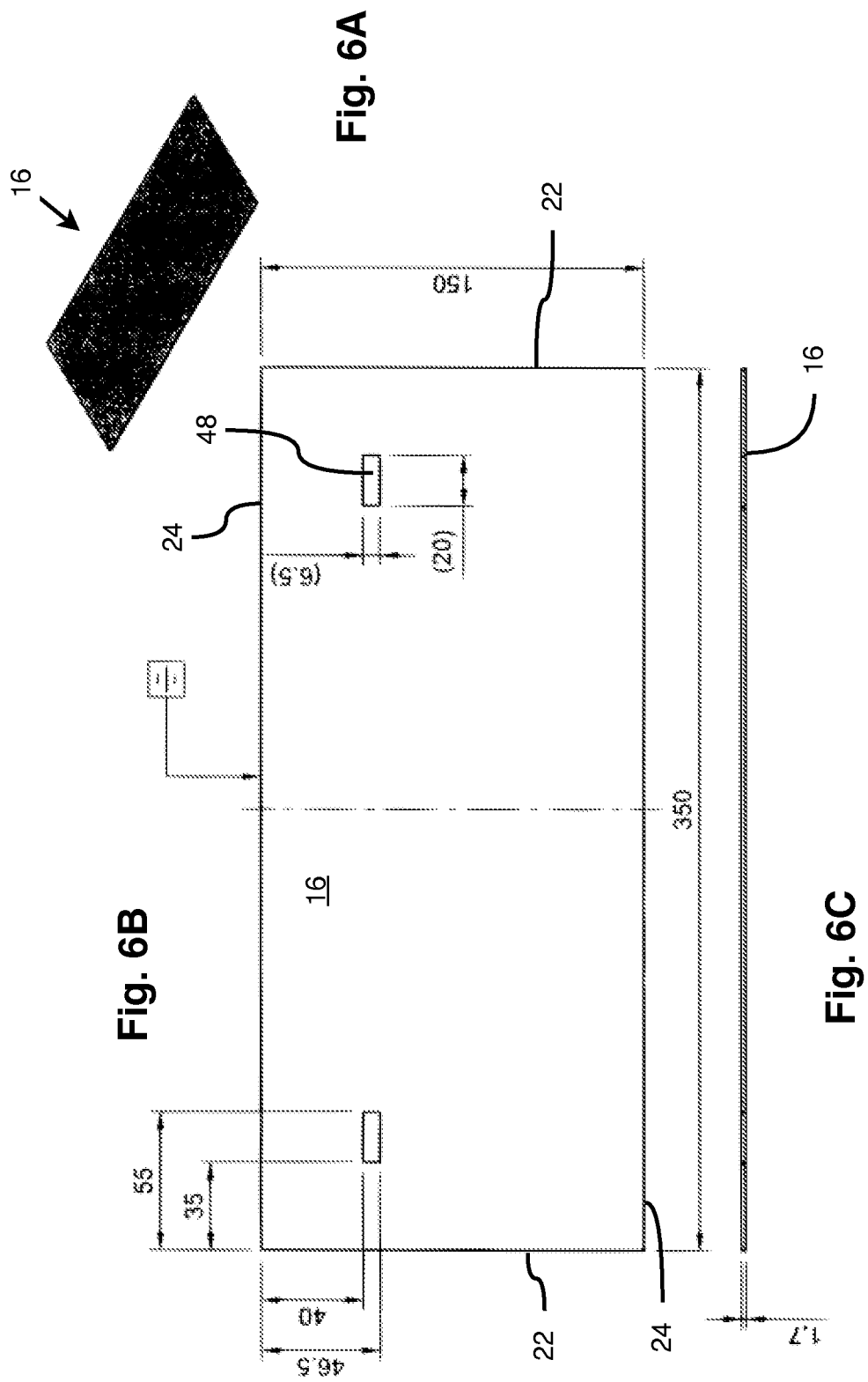

GARDENING TOOL

CROSS-REFERENCE TO RELATED APPLICATION

This application is claims priority from Canadian patent application 3072792 filed Feb. 18, 2020 and Canadian patent application 3102842 filed Dec. 17, 2020, the specifications of which are hereby incorporated herein by reference in their entirety.

BACKGROUND

(a) Field

The present invention generally relates to the field of gardening tools. More specifically, the invention relates to a multi-function gardening tool for conveniently building ridges, furrows and for making one or more grooves with an adjustable pitch between the grooves.

(b) Related Prior Art

A hoe is an ancient and versatile agricultural and horticultural hand tool used to shape soil, remove weeds, clear soil, and harvest root crops. Shaping the soil typically includes piling soil around the base of plants, building elongated ridges, as well as digging narrow furrows and shallow trenches for planting seeds or bulbs.

Although many improvements to the hoe have been suggested, it still remains a bit cumbersome to conduct all these tasks without using many different tools.

Swiss Patent no. 124284 to Rüesch discloses a gardening tool combining different functions depending on which side it is used. However, it does not allow making two or more grooves at a predetermined pitch in a ridge in order to plant seeds at a regular interval.

U.S. Pat. No. 1,414,087 to Kenny discloses a rake with a marking blade whose pitch may be adjusted to make marks or grooves in the soil. However, this tool does not provide the flexibility to make only one mark on the soil or to conveniently move soil to make ridges and furrows.

Japanese Utility Model no. 3200133 to Ryoichi teaches a gardening tool combining different functions located on two different sides of the tool. One function is provided by a blade allowing to move soil to build ridges and furrows while the other function is provided by two prongs allowing to make two grooves in the soil. However, this tool does not provide the flexibility to make only one groove in the soil or to vary the pitch between the grooves.

There is therefore a need for a gardening tool having improved flexibility in the functions it is capable of providing.

SUMMARY

It is an object of the present invention to provide a gardening tool that overcomes or mitigates one or more disadvantages of known gardening tools, or at least provides a useful alternative.

In particular, the present invention provides the advantage of combining different tools into one so that different gardening tasks may be carried with the same tool. The present gardening tool is compact and relatively light weight. Moreover, the present invention provides added adjustability, allowing for making grooves for planting seeds at different pitches.

In accordance with an embodiment of the present invention, there is provided a gardening tool adapted to being attached to a rake, the rake having an elongated handle and teeth. The gardening tool comprises a blade, an attachment system, a prong attachment and a prong. The blade has a perimeter defined by a first and a second lateral edges as well as a first and a second transversal edges. The attachment system, which attaches the blade to the rake, is operative to secure the blade against the teeth of the rake. The prong attachment is located on the blade proximate to the first lateral edge. The prong, being pivotally attached to the blade through the prong attachment, may selectively adopt one of the following positions: a) extending primarily beyond the first transversal edge; b) extending primarily beyond the first lateral side; and c) being stored primarily within the perimeter.

According to one aspect, the attachment system may comprise one or more screws and a retaining plate. The teeth of the rake are mounted between the blade and the retaining plate, thereby the retaining plate being operative to grip the teeth between the retaining plate and the blade.

According to one aspect, the gardening tool may further comprise a second prong attachment and a second prong. The second prong attachment may be located on the blade, proximate the second lateral edge. The second prong, being pivotally attached to the blade through the second pivot, may selectively adopt one of the following positions: a) extending primarily beyond the first transversal edge; b) extending primarily beyond the second lateral side; and c) being stored primarily within the perimeter. The first prong attachment and the second prong attachment may be located proximate to the first transversal edge. The first prong attachment and the second prong attachment respectively have a first prong attachment axis and a second prong attachment axis which may be substantially parallel to a longitudinal axis of the handle.

According to an aspect, the first and the second prong attachments each comprise an angle-setting mechanism to set the first prong and the second prong at a predetermined angle. This thereby allows positioning tips of both the first prong and of the second prong at a predetermined distance from each other. Optionally, the first prong and the second prong may each have markings providing an indication of this predetermined distance, or pitch, between the first prong and the second prong.

Preferably, the first and the second transversal edges may be longer than any one of the first and the second lateral edges. The first and the second lateral edges may substantially be symmetrically located on each side of the handle, distal from the handle. The first transversal edge may be proximal to the handle and the second transversal edge may be distal the handle. Optionally, the blade may be attached substantially normal to the handle.

BRIEF DESCRIPTION OF DRAWINGS

These and other features of the present invention will become more apparent from the following description in which reference is made to the appended drawings wherein:

FIGS. 5A, 5B and 5C are respectively a perspective view, a front view and a side view of a prong of the gardening tool of FIG. 1;

FIGS. 6A, 6B and 6C are respectively a perspective view, a front view and a side view of the blade of the gardening tool of FIG. 1.

DETAILED DESCRIPTION OF THE INVENTION

The realizations will now be described more fully hereinafter with reference to the accompanying figures; in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context, Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation, e.g., 10 percent, from the word it qualifies is acceptable as would be appreciated by one of ordinary skill in the art to operate satisfactorily for the intended purpose.

It further has to be noted that the dimensions provided on the figures are purely indicative of a particular realization and are not intended to be limiting.

In the following description, it is understood that terms such as "first", "second", "top", "bottom", "above", "below", and the like, are words of convenience and are not to be construed as limiting terms.

Figure 1:
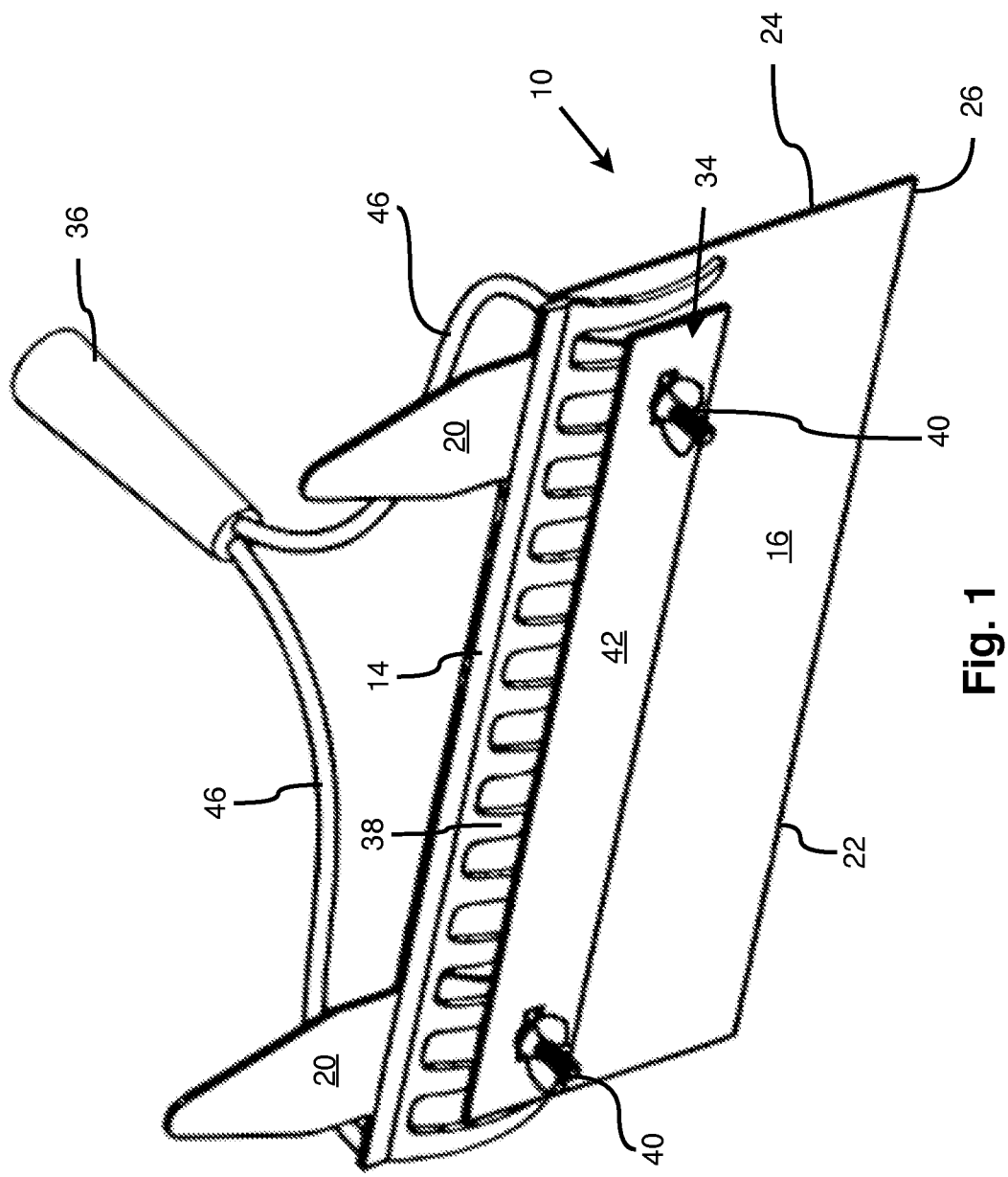
FIG. 1 is an isometric view from above and from the front of a gardening tool mounted to a head of a rake in accordance with an embodiment of the present invention.

The terms "top", "up", "upper", "bottom", "lower", "down", "vertical", "horizontal", "interior" and "exterior" and the like are intended to be construed in their normal meaning in relation with normal installation of the product, with the normal operative orientation of the gardening tool being provided on FIG. 1.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring now to FIG. 1, a gardening tool 10 mounted to the teeth 38 of the head 14 of a rake comprising a handle mount 36 to which an elongated handle (not shown) is normally mounted.

The gardening tool 10 comprises an attachment system 34 adapted to attach to the head 14 of a standard rake. According to an embodiment, the attachment system 34 secures the blade 16 against teeth 38 of the rake.

The gardening tool 10 is also provided with a blade 16 and at least one prong attachment 18 (see FIG. 4) and at least one prong 20 pivoting on a respective one of the at least one prong attachment 18.

Referring additionally to FIGS. 6A to 6C, typically the blade 16 is mostly rectangular in shape, although not necessarily, and has two lateral edges 22 and two transversal edges 24, together defining a perimeter 26. Typically, the transversal edges 24 are longer than the lateral edges 22.

The blade 16 may be made of plastic, steel, aluminum, composite materials or any other adequate material. Although called a blade in the present description, the blade 16 must not have sharp edges. The term blade is used here to describe a mostly flat component, although not necessarily completely flat since, according to alternative realizations, the blade 16 could have a small curvature, ribs or corrugations. The head 14 of the rake is typically mounted to the handle such that the handle mounted to the handle mount 36 is approximately normal to a plane defined by the blade 16.

The prong 20 and its prong attachment 18 are located on the blade 16 proximate one lateral edge 22. The prong 20 may selectively be a) extended beyond the top transversal edge 24a; b) extended beyond one lateral edge 22 or; c) be stored within the perimeter 26 of the blade 16.

Figure 4:
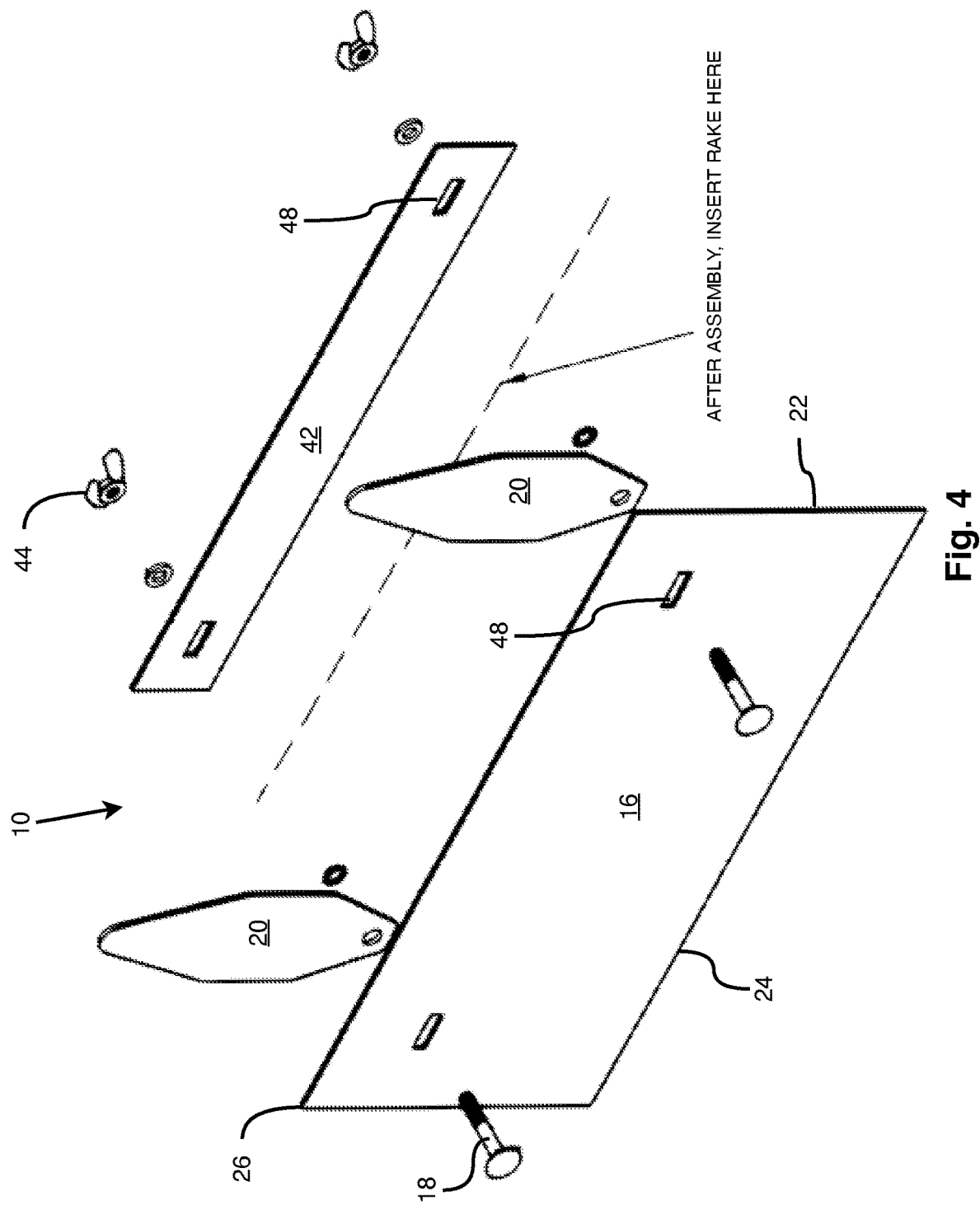
FIG. 4 is an exploded view of the gardening tool of FIG. 1.
Figure 7:
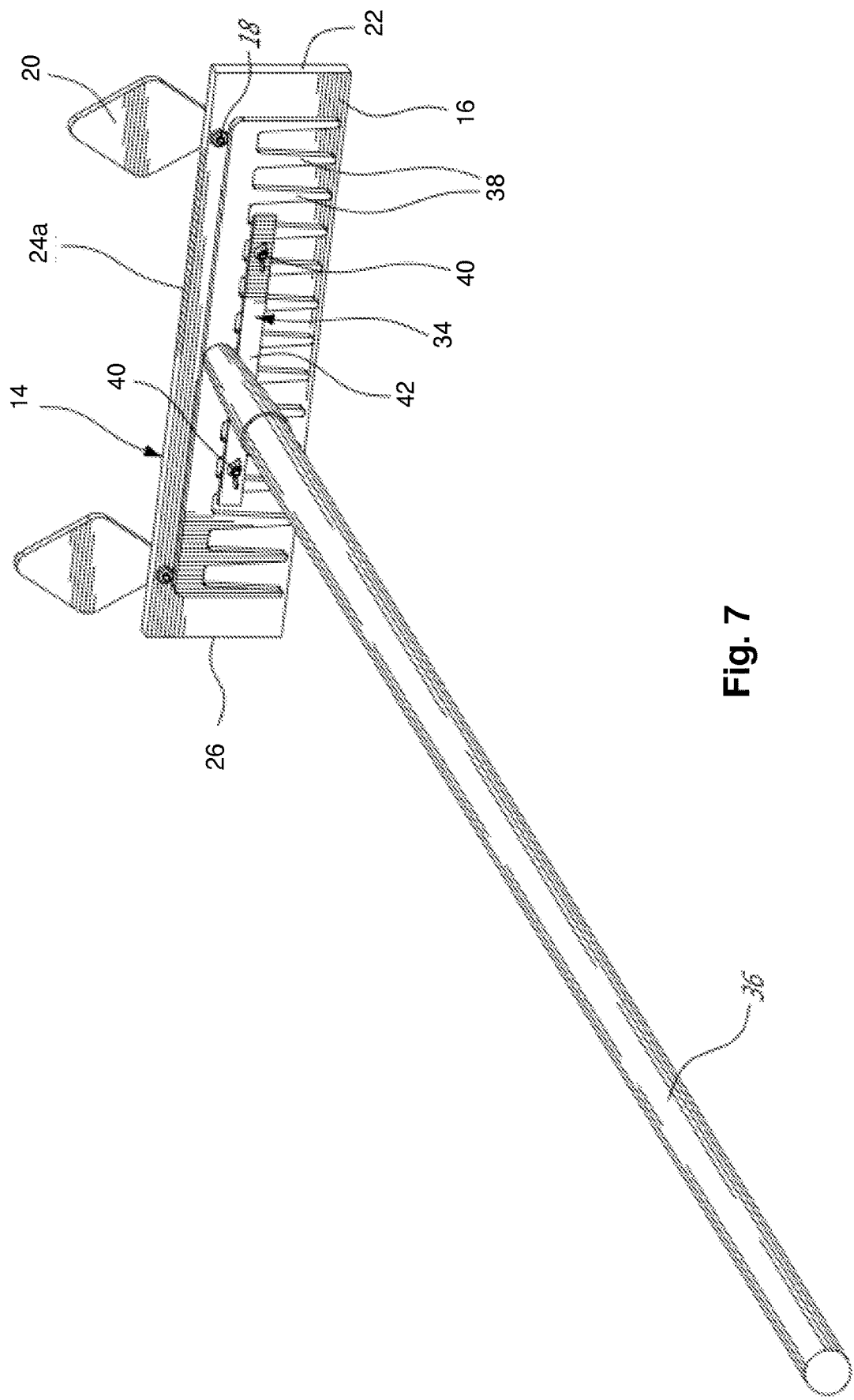
FIG. 7 is an isometric view from above and behind of a gardening tool in accordance with another embodiment of the present invention.

According to a realization depicted on FIG. 4, the prong attachments 18 are used both to secure the prongs 20 and the retaining plate 42.

According to a preferred realization depicted on FIG. 4, the prong attachments 18 are screws passing through the blade 16, the retaining plate 42 and its respective prong 20, Pivoting axes 28, aka shank, of the prong attachments 18 are preferably substantially aligned with a longitudinal axis of the handle 12. The prong attachments 18 may be designed to provide a certain resistance to pivoting so that the prongs 20 remain at a predetermined angular position, which also means a predetermined distance between the prongs 20, and so that the prongs 20 are not easily rotated when used in the soil. This resistance may be provided by an angle-setting mechanism, such as wing nuts 44 that tighten the prongs 20 against the blade 16 by friction. The angle-setting mechanism could also be a mechanism that more positively lock the prongs 20 in place, for example (not depicted) a tongue and groove arrangement between each prong 20 and the blade 16.

The prongs 20 and their prong attachments 18 are preferably laterally located offset from the center of the blade 16, each one proximate one of the lateral edges 22. The prongs 20 are each pivotally attached to the blade 16 through one prong attachment 18. When a second prong 20 is present, it is also laterally located offset from the center of the blade 16 and so is its own prong attachment 18. The one or more prong attachments 18 may also be located closer to the transversal edge 24 which is closer to the handle 12 of the rake. By so positioning the prong attachments 18 closer to one respective lateral edge 22 and to the transversal edge 24 closer to the handle 12 (hereafter referenced as the top transversal edge 24a), the prongs 20 may be made shorter. This may contribute to making a lighter gardening tool 10.

Figure 2:
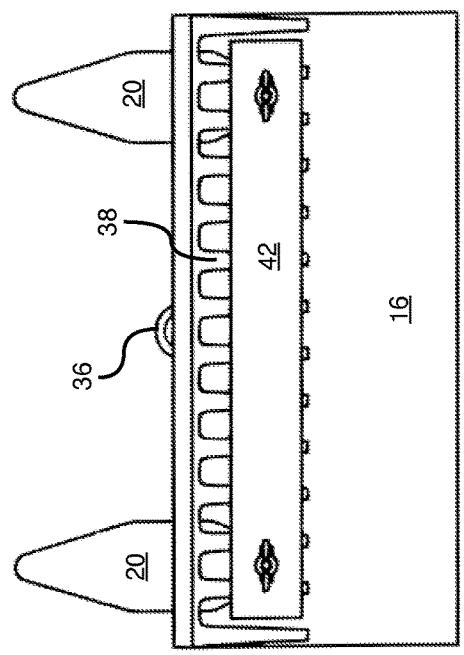
FIG. 2 is a front view of the gardening tool of FIG. 1 with the prongs oriented upright.
Figure 3:
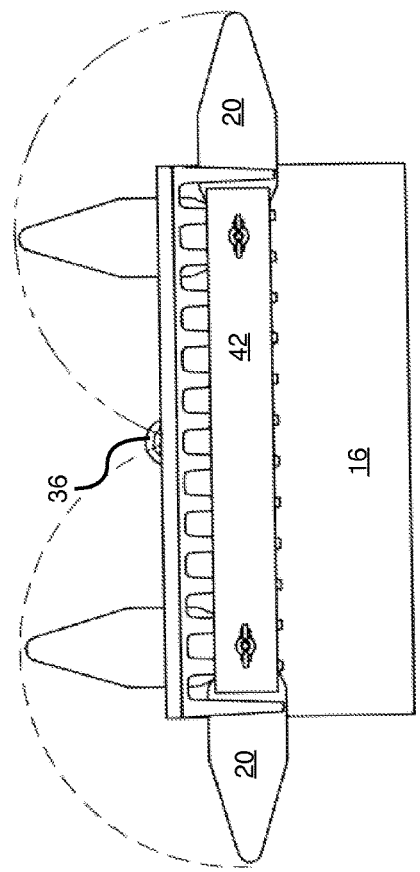
FIG. 3 is a front view of the gardening tool of FIG. 1 with the prongs oriented sideways.

Referring additionally to FIGS. 5A to 5C, the one or more prongs 20 comprising a tip 50 distal to the prong attachments 18, being pivotally attached to the blade 16 through one respective prong attachment 18, may selectively adopt one of the following working positions: a) extending primarily beyond the top transversal edge 24a (depicted on FIG. 2) or b) extending primarily beyond the lateral edge 22 to which it is closer (depicted on FIG. 3). When not in use, the one or more prongs 20 may be conveniently pivoted in a stored position (not depicted) primarily within the perimeter 26 of the blade 16, thereby being hidden by the blade 16. The one or more prongs 20 may be made of plastic, steel, aluminum, composite materials or any other adequate material.

Particularly when two or more prongs 20 are used, the prongs 20 may be provided with markings 32 (see FIG. 5B) providing thereby an indication of a pitch between the first prong and the second prong. This pitch may be adjusted by pivoting more or less the prongs 20 on their respective prong attachments 18.

In use, the blade 16 may be conveniently used to move soil in order to build elongated ridges and furrows. Using the bottom transversal edge 24b of the blade 16 to do so allows moving much soil at once. The longer transversal edge 24 also makes it easy to produce ridges and furrows of an approximately constant cross-section. If the gardening tool 10 is provided with only one prong 20, or if only one prong 20 is used while the one or more other prongs 20 are stored, this used prong 20 may then be pivoted from its stored position to extend beyond the lateral edge 22 to which it is closer. With one prong 20 so extended, the gardening tool 10 may then be turned on its side, that is with the lateral edge 22 towards the ground, so as to use the extended prong 20 to trace a groove in the ridges. Using the narrower lateral edge 22 may be convenient if one wants to make a groove with better precision and without displacing the surrounding soil or in narrow passageways. When the gardening tool 10 is provided with two prongs 20, both prongs 20 may be extended beyond the top transversal edge 24a. Then, the gardening tool 10 may be turned upside down to conveniently use both prongs 20 to create two parallel grooves in a ridge with one stroke. This may be convenient when one prefers to rapidly create grooves. According to realizations, the rake may be secured to the gardening tool 10 according to the depictions of FIG. 1 or 6 with both the gardening tool 10 and the rake turned upside down or with the rake secured upside down to the gardening tool 10 and thus when the gardening tool 10 is turned upside down, having the teeth 38 of the rake about the ground.

Referring now to FIGS. 1 and 3, the gardening tool 10 may be mounted to rakes of various designs, regardless of the design of the rake, the teeth 38 of the rake are secured between the blade 16 and the attachment system 34. Referring to FIG. 1, a rake may be mounted to the gardening tool 10 with the arms 46 passing over the blade 16 and the elongated handle 12 opposed to the side of the blade 16 on which is mounted the attachment system 34.

In preferred realizations, the attachment system 34 comprises at least one fastener 40, preferably two (2) fasteners 40, and a retaining plate 42. The retaining plate 42 provides a space between itself and the blade 16 to secure at least part of the teeth 38, e.g., ten (10) teeth 38 on FIG. 1, of a rake. The use of a screw with a wing nut 44 as the fastener 40 may be convenient to easily assemble and disassemble the head 14 from the rake by tightening or loosening the fastener 40.

According to a realization, the openings 48 in the blade 16 and the retaining plate 42 for passage of a portion of the fastener 40 may be transversally wider than the dimension of the portion of the fastener that crosses the blade 16 and the retaining plate 42. This wide clearance thereby allows to adjust the distance between the fasteners 40 to set the fasteners 40 between teeth 38, and thus to adjust to various configurations of teeth 38 of different rakes.

The present invention has been described with regards to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A gardening tool adapted for attachment to a rake having an elongated handle and teeth, the gardening tool comprising:
   a blade having a first and a second lateral edges and a first and a second transversal edges defining a perimeter;
   an attachment system for attaching the blade to the rake, the attachment system being operative to secure the blade against the teeth of the rake; and
   a prong being pivotally attached to the blade through the attachment system, the prong being pivotable so as to selectively adopt a plurality of positions, comprising:
      extending primarily beyond the first transversal edge;
      extending primarily beyond the first lateral edge; and
      being stored primarily within the perimeter,
   wherein the attachment system comprises two screws and a retaining plate, one of the two screws being operative to secure the prong to the blade and to pull the retaining plate toward the blade, the other one of the two screws being operative to pull the retaining plate towards the blade, wherein the retaining plate covers all the teeth between the two screws.

2. The gardening tool of claim 1 wherein the prong is a first prong, the gardening tool further comprising a second prong, the second prong being pivotally attached to the blade through the other one of the two screws, the second prong being pivotable so as to selectively adopt a plurality of positions comprising:
   extending primarily beyond the first transversal edge;
   extending primarily beyond the second lateral edge; and
   being stored primarily within the perimeter.

3. The gardening tool of claim 2 wherein the first prong and the second prong are secured to the blade proximate to the first transversal edge.

4. The gardening tool of claim 2, wherein the two scres each have an axis which is substantially parallel to a longitudinal axis of the elongated handle.

5. The gardening tool of claim 2, further comprising an angle-setting mechanism operative to respectively set the first prong and the second prong at a predetermined angle thereby yielding a predetermined distance between respective tips of the first prong and the second prong.

6. The gardening tool of claim 2, wherein the first prong and the second prong each have markings indicative of a pitch between the first prong and the second prong.

7. The gardening tool of claim 1, wherein the first and the second transversal edges are longer than any one of the first and the second lateral edges.

8. The gardening tool of claim 1, wherein the first and the second lateral edges are substantially symmetrically distal from the elongated handle, the first transversal edge being proximal to the elongated handle and the second transversal edge being distal to the elongated handle.

9. The gardening tool of claim 1, wherein the blade is attached substantially normal to the elongated handle.

10. A gardening tool adapted to be releasably attached to an elongated handle having a head mounted thereto, the gardening tool comprising:
    a blade having a first and a second lateral edges and a first and a second transversal edges defining a perimeter;
    an attachment system for attaching the blade to the head, the attachment system being operative to secure the blade against the head; and
    a prong being pivotally attached to the blade through the attachment system, the prong being pivotable so as to selectively adopt a plurality of positions, comprising:
        extending primarily beyond the first transversal edge;
        extending primarily beyond the first lateral edge; and
        being stored primarily within the perimeter,
    wherein the attachment system comprises two screws and a retaining plate, one of the two screws being operative to secure the prong to the blade and to pull the retaining plate toward the blade the other one of the two screws being operative to pull the retaining plate towards the blade, with the head being gripped between the retaining plate and the blade.

11. The gardening tool of claim 10 wherein the prong is a first prong, the gardening tool further comprising a second prong, the second prong being pivotally attached to the blade through the other one of the two screws, the second prong being pivotable so as to selectively adopt a plurality of positions comprising:
    extending primarily beyond the first transversal edge;
    extending primarily beyond the second lateral edge; and
    being stored primarily within the perimeter.

12. The gardening tool of claim 11 wherein the first prong and the second prong are secured to the blade proximate to the first transversal edge.

13. The gardening tool of claim 11, wherein the two screws each have an axis which is being substantially parallel to a longitudinal axis of the elongated handle.

14. The gardening tool of claim 11, further comprising an angle-setting mechanism operative to respectively set the first prong and the second prong at a predetermined angle thereby yielding a predetermined distance between respective tips of the first prong and the second prong.

15. The gardening tool of claim 11, wherein the first prong and the second prong each have markings indicative of a pitch between the first prong and the second prong.

16. The gardening tool of claim 10, wherein the first and the second transversal edges are longer than any one of the first and the second lateral edges.

17. The gardening tool of claim 10, wherein the first and the second lateral edges are substantially symmetrically distal to the elongated handle, the first transversal edge being proximal to the elongated handle and the second transversal edge being distal to the elongated handle.

18. The gardening tool of claim 10, wherein the blade is attached substantially normal to the elongated handle.

19. A gardening tool adapted for attachment to a rake having an elongated handle and teeth, the gardening tool comprising:
    a blade having a first lateral edge, a second lateral edge, a first transversal edge and a second transversal edge defining together a perimeter;
    at least two prongs each having a hole; and
    an attachment system for attaching the blade and the at least two prongs to the rake, the attachment system comprising a retaining plate and two screws, the retaining plate comprising two openings each having a width greater than a dimension of a portion of the screws that crosses the blade and the retaining plate,
    wherein each one of the two screws are operable to assemble the blade, the at least two prongs and the retaining plate such that, when tightened, all the teeth located between the two screws are wedged between the blade and the retaining plate, and wherein the width of each one of the two openings permits adjustment to various configurations of teeth of different rakes, and
    wherein each one of the at least two prongs is pivotably mounted to a respective one of the two screws so as to selectively adopt a plurality of positions, comprising:
        extending primarily beyond the first transversal edge;
        extending primarily beyond either the first lateral edge or the second lateral edge; and
        being stored primarily within the perimeter.

20. The gardening tool of claim 19, wherein the attachment system further comprises two nuts each cooperating with one of the two screws to tighten the attachment system,
    wherein the blade and the retaining plate each comprises two wide apertures parallel to the first transversal edge, and
    wherein distance between the two screws when each of the two screws passes through a respective one of the two wide apertures is thereby adjustable for a plurality of teeth configurations.

* * * * *